United States Patent Office 3,824,201
Patented July 16, 1974

3,824,201
MATURATED POLYESTER POLYURETHANE
COMPOSITIONS
Francis R. McGranaghan, Stow, and Henry Shanoski,
 Cuyahoga Falls, Ohio, assignors to The General Tire
 & Rubber Company, Akron, Ohio
No Drawing. Continuation-in-part of abandoned application Ser. No. 176,290, Aug. 30, 1971. This application Apr. 11, 1973, Ser. No. 350,107
Int. Cl. C08g 41/04, 22/42
U.S. Cl. 260—18 TN                    10 Claims

ABSTRACT OF THE DISCLOSURE

A moldable fiber-filled maturated thermosetting polyester resin-containing composition is achieved by reacting (A) a hydroxy-terminated, polyester resin having a hydroxyl functionality of between 3.0 and 1.8 in a standard molding formulation with (B) a polyisocyanate in an amount of at least about 85% but not more than 99% of the quantity necessary to cause the resin to reach its gel point and in contact with (C) a suitable catalyst for the reaction of isocyanate and hydroxyl groups, (D) an aliphatically-unsaturated monomer and a free radical polymerization catalyst.

CROSS-REFERENCE TO RELATED APPLICATION

This application is a continuation-in-part of U.S. patent application Ser. No. 176,290, filed Aug. 30, 1971 and now abandoned.

BACKGROUND OF THE INVENTION

This invention comprises fiber-filled maturated uncured unsaturated polyester resin-containing compositions for use in molding processes.

The problem of viscosity reduction encountered in molding thermosetting plastics has caused many plastic molders to switch to maturated resin systems. Viscosity reduction is the phenomenon of the thermosetting resin thinning or reducing in viscosity during heat-up in the mold just prior to the initiation of the crosslinking reaction. The thinned resin allows reinforcing fibers such as glass to settle out from the rest of the compound constituents. The final product will thus have resin-rich and resin-poor areas and exhibit unbalanced physical properties.

Viscosity reduction has been substantially overcome by adding certain agents to the polyester resin that will raise the viscosity of the resin compound to a rather high level (e.g., 20,000 poise at room temperature) without causing crosslinking, the agents being added a spaced period of time after compound preparations but before molding. The rise in resin viscosity following addition of the agents is known as "maturating" in polymer chemistry parlance. The initial low resin viscosity permits compounding, and the delay in viscosity rise following compounding insures thorough resin wetout of all of the constituents, especially reinforcing fibers. The subsequent viscosity rise permits preformed sheets of the resin to be handled in a tack-free condition and minimizes later viscosity reduction. In the art of maturating polyester resins the term "viscosity" is occasionally replaced by the term "consistency" because the maturated viscosity becomes so great, e.g., 20,000–50,000 poise, that the numbers become unwieldly. The term "consistency" is a more convenient method of describing these high viscosities, and consistency is measurable by a practice described in U. S. Pat. 3,536,642, the disclosure of which hereby is incorporated herein by reference.

A few maturating systems are already known and commerically practiced, U.S. Pat. No. 2,628,209 teaches a maturating system that involves the addition of magnesium oxide to the uncured resin compound. U.S. Pat. No. 3,536,642 teaches the addition of metal salts of certain organic acids to the uncured resin compound. These known maturing systems are based upon a complexing reaction between the carboxyl groups in the resin molecule and the agent that is added.

Research in molding thermosetting resin compounds has shown that the consistency of the maturated compound significantly affects both the workability of the compound and the surface quality of the molded article. If the maturated compound is too thick, it won't flow properly in the mold thereby affecting internal strength and ultimate surface quality. This quality variation appears in the form of varying amounts of sink holes and other geometric deformities, checks and crazes, the ability of the surface to accept paint and the overall smoothness of the surfaces.

Known maturating techniques do not provide a sufficient degree of batch-to-batch uniformity in consistency to permit high quality part production. Once the proper molding conditions (temperature, mold closure rate, holding time, ram pressure, etc.) have been determined for a batch of maturated resin, a new batch of resin having a different maturated consistency has required redetermination of most if not all of the molding conditions to obtain the same or similar surface quality. This problem has required the molder to send most or all of the molded parts through a secondary surface treatment for repair of the deformities, and such secondary treatments have raised manufacturing costs because of the extensive handling required to where the treated parts have become only marginally economically attractive over other materials and molding techniques. Much of this batch-to-batch non-uniformity has stemmed from the polyester resin manufacturing techniques currently employed in the industry.

Polyester resins are conventionally made from glycols and unsaturated and saturated carboxylic acids. The mole ratio of unsaturated acid (e.g. fumaric acid) to saturated acid (e.g. phthalic anhydride) in thermosetting resins is generally at least about 2:1. The esterification reaction is driven to the desired degree of completion with heat, and then the ester is isomerized with further heating. This heating also promotes a certain amount of branching at points of unsaturation in the molecule. The finished polyester thus contains a moderate amount of unsaturation from the unsaturated acid residue for later crosslinking with styrene or other vinyl monomer and also contains pendant and terminal hydroxyl groups from the glycol and terminal carboxyl groups from the acids either on the branches or on the polymer backbone. The branching of the molecule caused by the heat is unpredictable from batch-to-batch and, thus, the functionality of each polyester varies widely as to location and relative frequency of hydroxyl and carboxyl groups.

Recent developments have determined that to obtain fiber reinforced polyester moldings that experience low shrinkage during molding and exhibit high-surface qualities the molding compound requires, inter alia, (1) a highly reactive polyester resin in terms of low equivalent weight per double bond, (2) a crosslinking monomer, (3) a thermoplastic low-shrink additive either soluble in or capable of imbibing larger quantities of the crosslinking monomer to form a second phase either before or during the molding operation, (4) the proper balance of fillers and reinforcing fibers in the resin as well as the proper dispersion of these materials and their proper wetting by the uncured polyester resin, (5) a controllable level of maturated consistency to provide proper resistance to flow and to permit uniform pressure to be exerted over the total molded part area, (6) a catalyst-inhibitor system balanced to the point where it permits mold closure prior to any substantial amount of polymerization, and (7) a satisfactorily reproducible batch-to-batch molecular structure of the polyester resin. Such a system is described in U.S. Pat. No. 3,701,748, the disclosure of which is hereby incorporated herein by reference.

To make a highly reactive polyester resin, in terms of low equivalent weight per double bond, the feed of these conventional resin manufacturing processes must be altered in favor of more unsaturated acid. This increases the likelihood of polymer branching and even further reduces the batch-to-batch uniformity of the resin. As the prior art maturation systems depend mainly upon hydrogen bonding or other such complexing to form an extended linkage of polymer molecules, the variation in hydroxyl and carboxyl functionality between different batches of resin causes this complexing to be erratic.

The compounds of this invention are accomplishd by the addition of controlled quantities of polyisocyanates to uncured hydroxy terminated or hydroxy carboxy terminated polyester resins. The mechanics are briefly illustrated in U.S. Pat. No. 2,625,535, but this reference is directed to the preparation of rubber-like materials with a diisocyanate being used to chain-extend and crosslink a polyester containing at most very small amounts of unsaturation. In our systems the isocyanate groups enter into conventional chemical reaction (in contrast to ionic bonding reactions) with the hydroxyl groups to form a new long chain polymer made from shorter polymeric units joined together through urethane groups. The new polymer is not crosslinked as the isocyanate does not attack the unsaturation in the molecule but reacts only with the hydroxyl groups. Thus crosslinking can still take place by addition reaction with vinylic monomers such as styrene. It should be kept in mind that this inveniton, while being a part of the "maturating" art, is totally different from prior art maturating processes because, inter alia, a new polymer is formed instead of a complexed or ionically bonded base polymer.

SUMMARY OF THE INVENTION

This invention comprises fiber-filled maturated, curable thermosetting polyester resinous molding compounds in which the resin is a hydroxy-terminated unsaturated polyester resin reacted with a polyisocyanate in an amount of between about 85% to about 99% of the quantity necessary to cause the resin to reach it gel point. The polyester resin is a conventionally prepared polyester resin with a hydroxyl functionality between about 3.0 and about 1.8 and is preferably a linear or substantially linear, hydroxyl-terminated polyester with a hydroxyl functionality between 1.8 and 2.2 and an acid number no greater than about 2. Otherwise, the polyester resin conforms to that described in U.S. 3,701,748 with at most up to about 25 mole percent of the acid being saturated.

Therefore, the main object of this invention is to provide an improved maturated uncured thermosetting polyester resin compound with a stable controlled viscosity useful for producing higher quality, more economically molded FRP (Fiber Reinforced Polyester) products with enhanced surface quality and improved paint adhesion. This and other objects which are apparent from the description of the preferred embodiments are satisfied by this invention.

DESCRIPTION OF THE PREFERRED EMBODIMENT

The maturated resin molding compound of this invention can be in the form of a bulk molding compound (BMC) or in the form of a sheet molding compound (SMC) as both are contemplated herein. BMC and SMC compounds are explained in detail in United States Pat. 3,536,642. While the following description is confined to SMC compounds, it should be clearly noted that BMC compounds are fully contemplated.

Generally speaking, in the molding of SMC compounds a plurality of sheets of SMC compound are cut to the general outline of the article to be molded, are stacked in a predetermined number of layers, and are inserted into the cavity of a compression molding machine. The machine is closed to form the layers into the desired configuration, and the layers are heated therein so that the thermosetting resin will crosslink and form a solid article, the crosslinking taking place through the aliphatic unsaturation in the polyester. Examples of articles made by this technique include automobile body parts, appliance housings, furniture elements, tables and chairs, and luggage. Generally they comprise a cured polyester resin compound having at least one exposed surface. The maturated compounds of this invention when used in molding flow properly into the mold and maintain the desired dispersion of fibrous fillers during both mold-filling operation and the curing cycle to produce articles that are characterized by excellent internal strength as well as excellent surface quality and a high degree of adhesion between the exposed surface of the article and an overlying paint or other covering film applied thereto. These aspects are extremely important for articles encountering rather severe environments such as automobile exterior components like fenders and fender extensions that are exposed to not only varying temperatures and degrees of humidity but flying debris such as dust particles, sand, grit and the like.

The maturation of the polyester resin takes place in the uncured state. The uncured (uncrosslinked) polyester resin compound generally comprises a homogeneous blend of an hydroxy-terminated, unsaturated polyester resin with various other constituents as described in the aforesaid U.S. 3,701,748. These polyester resins are well known and are conventionally made by the condensation of at least one unsaturated polycarboxylic acid or anhydride and at least one polyhydric alcohol wherein water is removed during the condensation—esterification reaction. Examples of suitable unsaturated polycarboxylic acids include alpha, beta ethylenically unsaturated dicarboxylic acids and their anhydrides such as fumaric acid, maleic acid, and maleic anhydride. Examples of saturated polycarboxylic acids and their anhydrides include the phthalic acids, phthalic anhydride, succinic acid, adipic acid and itaconic acid. Other polycarboxylic acids usable herein include citric acid, pyromellitic acid and trimesic acid.

The preferred polyhydric alcohols usable herein to make the polyester resin are the hydrocarbon diols, more preferably the alkylene glycols such as ethylene glycol, propylene glycol, tetramethylene glycol and decamethylene glycol.

Nonlinear or branched hydroxy-terminated and hydroxy-carboxy-terminated polyester resins usable herein are those having an average of between 1.8 and 3.0 terminal hydroxyl groups per molecule. The hydroxyl groups are always terminal, i.e., they are located at or near the free ends of the branches and the polymer backbone and thus are in an exposed position to react with the added isocyanate.

Below a hydroxyl functionality of about 1.8 there are insufficient hydroxyl groups present on the molecules to form the required linkages to increase the polymer viscosity sufficiently for successful maturation. Above a hydroxyl functionality of about 3.0 it becomes difficult to achieve reproducible consistency and crosslinking or gelation can occur with the isocyanate before the molecules can form end-to-end linkages. Between these functionality values the polyester resin remains at workable viscosity for a controllable period of time following combination with polyisocyanate and then increases to a non-tacky, somewhat flexible material which thereafter remains that way for a long time, e.g. three months or more.

The molecular weight of the unsaturated (and unmaturated) polyester resin usable herein should lie within a range of between about 1,000 to about 5,000 and preferably about 2,000. Resins of a molecular weight in excess of about 5,000 have excessive viscosity and create blending problems and inhibit wetting of the reinforcing fiber. By far, it is preferred that the polyester resin have a molecular weight in the area of about 2,000 to provide the best balance of initial viscosity, maturated consistency, and overall physical properties.

While the acid number of the polyester resin can be 3 or greater, especially with branched resins, it is preferred that the polyester be linear and that the acid number of the unsaturated polyester resin be less than about 2, more preferably less than 1, because the presence of carboxyl groups interferes with and retards the reaction between hydroxyl and isocyanate groups. United States Pat. No. 3,538,043 provides a successful route to the manufacture of essentially linear, unsaturated, hydroxy-terminated polyester resins of controllable molecular weight, and the disclosure of such patent is hereby incorporated herein by reference. The materials that can be prepared by the teachings in this patent have been found to produce the best molded surface from the standpoint of uniformity, overall quality, and adhesion to paint.

It is desirable to add a desiccant to the polyester resin to remove all traces of water prior to treating it with the polyisocyanate to eliminate foaming that is caused by the water-polyisocyanate required to maturate the resin. Calcium sulphate is preferred from a commercial standpoint because it is easily handled and has the least effect on maturation or polymerization.

The unsaturation in the polycarboxylic anhydride or acid carried over into the polyester resin from the esterification reaction is utilized in crosslinking the polyester molecules through an ethylenically unsaturated polymerizable liquid monomer like styrene or vinyl toluene in a free-radical, addition-type curing reaction as described in U.S. Pat. No. 3,701,748. It is preferred that these monomers be used in amounts ranging from about 1.5 to 2.5 moles of unsaturation in the monomer per mole of aliphatic double bond in the polyester resin. At ratios below about 1.5:1 full crosslinking of the resin is not usually achieved while at ratios higher than about 2.5:1 the monomer tends to homopolymerize and begins to form a separate phase in the cured polyester matrix. It has been found that a ratio of approximately 2 moles of unsaturation in the monomer per mole of double bond in the polyester provides the highest degree of crosslinking in balanced combination with the highest level of physical properties appearing in the final product.

To the combination of the hydroxy-terminated, unsaturated polyester resin and the ethylenically unsaturated polymerizable liquid monomer is optionally added a low shrink thermoplastic based additive generally in the form of a thermoplastic powder solubilized in part or all of the aforementioned polymerizable liquid monomer. This is also described in U.S. Pat. No. 3,701,748. This low shrink technology is also described in British Patent Specifications Nos. 1,201,087 and 1,201,088, the disclosures of both of which are also hereby incorporated herein by reference. In the instant invention it is preferable to add 10 to 30 parts by weight of the low shrink thermoplastic additive per 100 parts of the pure polyester resin.

Fillers are generally added to the uncured compound to reduce overall material costs without sacrificing a significant amount of physical properties in the final product. Of particular interest are reinforcing fibers such as glass fibers. However, many other different types of fillers can be used herein, such as, inorganic fillers like silicate, asbestos, calcium carbonate, mica, barytes, clay, diatomaceous earth, microballoons, microspheres and Fullers earth and organic fillers like wood flour, cork dust, cotton flock, wool felt, shredded cornstalks and ground nut shells. These fillers may be added in amounts ranging from about 20 parts to 1,000 parts by weight per 100 parts of the pure polyester resin.

Generally, a small amount of polymerization inhibitor such as the pyrocatechols and hydroquinones is added to the uncured compound to prevent either spontaneous polymerization of the monomer or premature crosslinking of the monomer and the polyester resin during compounding, storage, and in the early part of the molding cycle. Such inhibitors are added in amounts ranging from 100 parts per million to 5,000 parts per million based upon the combined weight of the monomer and the polyester resin.

Next, a free radical polymerization catalyst is added to the uncured compound so that upon heating to the catalyst activation temperature the addition-type crosslinking polymerization reaction will commence between the polymerizable monomer and the unsaturated polyester resin. Such catalyst is usually used in an amount in the range of about 0.1 to 3.0 parts per 100 parts of total monomer and resin. As is well-known in the art, a wide range of free radical generating polymerization catalysts are usable, the most common being diacyl peroxides like lauroyl peroxide, benzoyl peroxide, parachlorobenzoyl peroxide, and 2,4-dichlorobenzoyl peroxide; ketone peroxides such as methyl ethyl ketone peroxide, cyclohexanone peroxide, methyl isobutyl ketone peroxide, and others including dicumyl peroxide, 2,2'-bis(4,4'-ditertiary butyl peroxy cyclohexol propane), ditertiary butyl peroxide, cumene hydroperoxide, tertiary butyl cumyl peroxide and teritary butyl perbenzoate.

Another catalyst can be added to the above composition to catalyze the reaction between the isocyanate groups and the terminal hydroxyl groups as is well-known in the urethane art. A wide variety of such catalysts can be used herein such as tertiary amines like triethylene diamine, N-methyl morpholine, N-ethyl morpholine, diethyl ethanolamine and N-cocoa morpholine, 1-methyl-4-dimethylamino ethyl piperazine, N-3-methoxypropyl-N, N-dimethylamine, N,N-diethyl-N'-methyl-N'-isopropyl propylene diamine, N,N-diethyl-3-diethyl amino propyl amine, dimethyl benzyl amine and N,N-dimethylaniline and tin salts of carboxylic acids such as dibutyl tin dilaurate, dibutyl tin di-2-ethyl hexoate stannous octoate and stannous oleate, the tin salts being preferred. These catalysts are generally added in amounts ranging from 0.03 to 1.50 parts by weight based upon 100 parts of the pure polyester resin, either singly or in various mixtures.

Either to the polyester resin alone or to the homogeneous blend of ingredients is added a polyisocyanate for the purpose of subsequent reaction with the terminal hydroxyl groups of the polyester resin molecules to connect them together through urethane lingakes. The commonest representative polyisocyanates usable herein include: toluene-2,4-diisocyanate, toluene - 2,6 - diisocyanate, commercial mixtures of 2,4- and 2,6-toluene diisocyanate, the meta- and para-phenyl diisocyanates, 1,5-naphthalene diisocyanate, para- and meta- xylylene diisocyanates, the alkylene diisocyanates such as tetramethylene diisocyanate and hexamethylene diisocyanate, 2,4- and 2,6-diisocyanato methylcyclohexane, dicyclohexylmethane diisocyanate, 4,4'-diisocyanato diphenyl methane (MDI) and polymeric MDI containing an average of from 2 to 3 isocyanate groups per molecule.

The basis of this invention is the control of viscous flow properties of a thermosetting polyester resin by the use of polyisocyanate in an amount of at least about 85% but not more than 99% of the quantity necessary to cause the resin to reach its gel point. The reason for this is that at amounts less than about 85%, insufficient chain extension occurs to provide any usable degree of control or any usable viscosity increase. Likewise, at amounts that cause the resin to reach or exceed its gel point, the resin crosslinks through allophanate linkages that form from the reaction between the excess isocyanate and the hydrogen atom in the urethane linking group. The crosslinked matter (gel) appears as granular particles that interefere with flow properties as well as significantly deteriorating molded surface quality.

It is preferable that the isocyanate groups in the polyisocyanate be equal or nearly equal in reactivity. This is because the maturation is more closely controlled when the isocyanate groups are capable of reacting with the hydroxyl groups at the same or similar rate to give a controllable rise in resin viscosity to a controlled or known level of final consistency within a reasonable amount of time. By reasonable amount of time is meant that with polyisocyanates of equal isocyanate group activity, maturation is achieved in times varying from two hours and longer but generally less than 16 to 18 hours. With isocyanate groups of unequal reactivity, the maturation time is stretched out to as long as three and four days or more so that a mold operator would be required to maintain a large inventory of material. One of the preferred polyisocyanates having equally reactive isocyanate groups is 4,4'-diisocyanato diphenyl methane, commonly referred to in the trade as "MDI." Within the range of 85% to 99% of the amount necessary to cause the resin to reach its gel point, the range of 88% to 92% has been found to produce the most desirable degree of maturation from the standpoint of control and final consistency.

The term "gel point" is conventionally defined as the sharp change in a polyester resin from a viscous liquid to an elastic gel. It is also the point beyond which the polyester is no longer 100% soluble in a suitable solvent such as tetrahydrofuran (THF), the nonsoluble part being crosslinked or gelled. The crosslinking can be a curing mechanism in a polydimensional polymer or it can be an extraneous reaction such as the aforementioned allophanate linkage formation.

The gel point of a polyester resin can be determined by simple tests that do not reach the point of undue experimentation. One such test is clearly described in the popular text "*Principles of Polymer Chemistry,*" Paul J. Flory, Cornell University Press, 1953. Another test is described in "*The Determination of Reactive-Group Functionality from Gel Point Measurements,*" Strecker and French, Journal of Applied Polymer Science, Volume 12, pp. 1697–1712 (1968). In addition, the reactive group functionality can also be determined by tests that do not reach the point of undue experimentation. Such tests are already known to those skilled in the art and one such test is set forth in the latter of the above-described articles.

Simultaneously or nearly simultaneously with admixing the polyisocyanate, the aforedescribed polyester resin compound is brought into intimate contact with a mass of reinforcing fibers and formed into a mold charge which can be either a sausage-shaped slug (BMC) or a sheet (SMC). This simultaneity is required so that the uncured resin and other constituents wet the surface of the individual fibers before the resin starts to maturate. This technique provides the best possible bonding environment between the reinforcing fibers and the cured polyester resin. If contact with the fibers were delayed too long after admixing the polyisocyanate, the viscosity of the polyester resin would possibly be too high to permit adequate wetting of the fiber surfaces thus deteriorating the overall strength of the bond between the resin and the fibers.

The reinforcing fibers can be in the form of woven or nonwoven cloths or batts or in the form of bulk fibers either continuous or chopped. The fibers and resin compound are mixed under shear sufficient to form an intimate dispersion of both components without gross breakage of the individual fibers, and this dispersion is then formed into a thin sheet. This is commonly done in a special machine that chops long strands of reinforcing fibers into short staple fibers, intimately mixes them with the polyisocyanate-containing polyester resin composition and subsequently forms this fiber-containing mixture into a sheet or thin layer. As the newly formed sheets of wet mixture are extremely tacky, they are covered on both sides with a thin, relatively nonporous film such as polyethylene film or polypropylene film and rolled up or otherwise stored for a sufficient length of time to permit maturation to take place.

Upon completion of maturation, the sheet may be unrolled and the nonporous films stripped away to reveal a nontacky, rather flexible sheet of fiber-containing (extended but not crosslinked) polyester resin that is ready to be cut into a desired outline and stacked in layers in a compression molding press whereupon it will be pressed into the desired configuration and heated to activate the free radical generating catalyst to begin the crosslinking reaction between the polymerizable monomer and the unsaturated polyester resin.

Note that the system of this invention is not simply a thermosetting or thermoplastic polyesterurethane system which crosslinks through the urethane linkages in the same manner as the aforementioned gel formation. The system of this invention employs less isocyanate and an unsaturated polyester which crosslinks through the aliphatic unsaturation in the polyester.

A wide variety of reinforcing fibers are available for use herein to form the sheet molded compound such as asbestos fibers, cotton fibers, silk fibers, rayon fibers, woolen fibers, cuprammonium rayon fibers, cellulose acetate fibers, nylon fibers, polyester fibers, polyvinyl chloride-acetate fibers, polyvinylidene chloride fibers, polyvinyl chloride fibers, polyethylene and polypropylene fibers, casein fibers, ground nut fibers, and other fibers such as glass fibers, steel fibers and whiskers, boron fibers and whiskers, and graphite fibers and whiskers. Glass fibers are the most desirable fibers for most applications because of their low cost and high strength. Generally speaking, the fiber content may range from as low as 10 weight percent to as high as 80 to 90 weight percent of the total molding composition, but is preferably in the range of 15 to 25 weight percent for BMC and 25 to 35 weight percent for SMC.

The following examples illustrate this invention generally and the best known modes for its preparation. These examples are not intended to limit this invention. Unless otherwise noted, all quantitative measurements are by weight. These systems are not significantly affected in their operation by the inclusion of reinforcing fibers, such as glass fibers, in amounts ranging from 15 to 35 percent of the total molding composition so that the formulation work could be and was done without the fibers being present.

EXAMPLE 1

An unsaturated linear, hydroxy-terminated polyester resin A was made according to the basic recipe shown below:

| Ingredients: | Parts |
|---|---|
| Fumaric acid | 406 |
| Maleic anhydride | 4900 |
| Propylene oxide | 3966 |
| Dibutyltin dilaurate | 5 |
| Reaction temperature 170°–190° F. | |
| Styrene (as a solvent) | 3782 |
| Benzoquinone | 2.3 |
| Hydroquinone | 2.3 |
| Piperidine (for isomerization) | 69 |

The specific teachings for preparing the resin may be found in United States Pat. 3,538,043, issued to Robert Johnston Herold, title Polymeric Esters and Methods. The product of the above preparation was a linear, hydroxy-terminated polyester resin of acid number 0.21, hydroxyl number 39.3, molecular weight 2000, and hydroxyl functionality 2.0.

This linear resin A was combined with the ingredients shown below using conventional polymer compounding techniques:

Ingredients: Parts
- Resin A .......................................... 100
- Low shrink additive B (35 by wt. solution of polymethyl methacrylate in styrene) .......... 66
- Styrene .......................................... 20
- Zinc stearate .................................... 7
- Benzoquinone .................................... 0.4
- Calcium sulfate desiccant ...................... 40
- $CaCO_3$ ........................................ 320
- Dibutyltin dilaurate ............................ .1
- MDI 92 to 94% Stoich.*

*94.0% of the stoichiometric quantity necessary to cause the resin to reach its gel point.

A commercial branched polypropylene fumarate polyester resin C having an acid number of 20, a hydroxyl number of 30, a molecular weight of about 2000 and a hydroxyl functionality of slightly over 2 was compounded according to the recipe below using conventional polymer compounding techniques:

Ingredients: Parts
- Resin C .......................................... 100
- Low shrink additive B .......................... 66
- Styrene .......................................... 20
- Zinc stearate .................................... 7
- Benzoquinone .................................... .12
- $CaCO_3$ ........................................ 330
- MgO .............................................. 6.4
- $H_2O$ .......................................... 0.8

These two resins were then tested for shear stress-shear strain properties (thickening) using conventional extrusion equipment. The following data was obtained at 90° F.:

| Shear rate (sec⁻¹) | Linear polyester A, MDI thickened 94% St. | Linear polyester A, MDI thickened 92% St. | Branched polyester C, MgO thickened |
|---|---|---|---|
| 1.0 | 2.0 | .9 | 1.7 |
| 5.0 | 5.0 | 2.5 | 7.2 |
| 10.0 | 7.8 | 4.0 | 13.0 |
| 20 | 12.0 | 6.3 | |
| 30 | | 8.2 | |

The three samples were then tested at 200° F. The data is tabulated below:

| Shear rate (sec⁻¹) | Linear polyester A, MDI thickened 94% St. | Linear polyester A, MDI thickened 92% St. | Branched polyester C, MgO thickened |
|---|---|---|---|
| 1.0 | .55 | .022 | .04 |
| 5.0 | 1.3 | .07 | .095 |
| 10.0 | 1.8 | .12 | .13 |
| 20.0 | 2.6 | .21 | .22 |
| 30.0 | 3.3 | .29 | .31 |

This example shows that thickening of the respective resin occurs with polyisocyanates and with magnesium oxides so that both systems may be generally regarded as maturating techniques although their respective chemistry is significantly different as described earlier. These examples also show that maturation stemming from the practice of this invention provides equal or reduced sensitivity to heat. This may be explained in part by the fact that the practice of this invention produces a new material in that the molecules are irreversibly linked together through urethane groups whereas the molecules in the magnesium oxide maturated resin are reversibly linked together through weaker ionic bonds.

EXAMPLE 2

Samples of the linear polyester resin A of Example 1 (without polyisocyanate) were treated with varying amounts of MDI and then followed to fully maturate. The observations of the fully maturated samples are listed below:

| Percent MID of amount necessary resin to reach gel point: | Visual observation of maturated resin |
|---|---|
| 50 | Remained soft and tacky, did not become tack-free. |
| 60 | Do. |
| 70 | Do. |
| 80 | Do. |
| 85 | Stiffened, became tack-free. |
| 95 | Do. |
| 99 | Became very stiff, tack-free. |
| 100 | Became a rubber, elastic mass, tack-free but would not remain in a desired shape. |
| 105 | Do. |
| 110 | Became too stiff to bend, non-moldable, was tack-free. |

This example shows the useful range of addition of polyisocyanate as being between about 85% to about 99% of the stoichiometric quantity necessary to cause the resin to reach its gel point. Below the usable range the resin did not become tack-free; above the usable range it became either too rubbery to flow well or too stiff to mold.

EXAMPLE 3

A commercial branched polypropylene-phthalate-fumarate was blended as a 65% solution in styrene with 95% of the stoichiometric quantity of MDI necessary to cause the resin to reach its gel point and the viscosity of the blend observed periodically for 600 hours. The data of viscosity as a function of time are tabulated below:

| Hours after addition of MDI: | Viscosity (Poise) |
|---|---|
| 1 | $2 \times 10^3$ |
| 1.5 | $6.8 \times 10^3$ |
| 5 | $4 \times 10^4$ |
| 30 | $6 \times 10^4$ |
| 120 | $6.6 \times 10^4$ |
| 150 | $6.2 \times 10^4$ |
| 300 | $5.9 \times 10^4$ |
| 500 | $6 \times 10^4$ |

This example shows the stability of maturated viscosity by the use of this invention.

EXAMPLE 4

A sample of the linear polyester resin A of Example 1 was combined with the ingredients shown below using conventional polymer compounding techniques:

Ingredients: Parts
- Resin A .......................................... 100
- Low shrink additive B .......................... 36
- Styrene .......................................... 30
- Calcium stearate ................................ 7
- Benzoquinone .................................... 0.20
- Calcium sulfate desiccant ...................... 40
- Calcium carbonate .............................. 350
- Dibutyl tin dilaurate ........................... 0.50
- Tertiary butyl perbenzoate ..................... 2

Samples of this compound were treated with varying percentage quantities of isocyanate based on the stoichiometric quantity necessary to cause the resin to reach its gel point, and the long term maturated viscosities were checked. The viscosities appear below:

| Time days | Viscosity | | | | |
|---|---|---|---|---|---|
| | 88% stoich., poise ×10⁴ | 90% stoich., poise ×10⁴ | 92% stoich., poise ×10⁴ | 94% stoich., poise ×10⁴ | 96% stoich., poise ×10⁴ |
| 1 | 1.1 | 1.5 | 2.4 | 5.2 | 9.0 |
| 3 | 1.1 | 1.5 | 2.5 | 5.1 | 8.0 |
| 5 | 1.1 | 1.6 | 2.6 | 5.7 | 7.0 |
| 10 | 1.2 | 1.7 | 2.7 | 5.6 | 8.5 |
| 20 | 1.1 | 1.8 | 2.8 | 5.6 | 8.5 |
| 50 | 1.2 | 1.9 | 3.0 | 6.2 | 8.5 |
| 100 | 1.5 | 2.5 | 3.1 | — | — |

This example shows the control over ultimate viscosity with a change in polyisocyanate addition as well as the long term stability of the maturated compounds.

EXAMPLE 5

A sample of the linear polyester resin A of Example 1 was combined with the ingredients shown below using conventional polymer compounding techniques:

| Ingredients: | Parts |
|---|---|
| Resin A | 100 |
| Low shrink additive B | 66 |
| Styrene | 20 |
| Zinc stearate | 7 |
| Calcium carbonate (filler) | 320 |
| Commercial molecular sieves (desiccant) | 10 |
| Benzoquinone | 0.04 |

Samples of the above blend were treated with various quantities of dibutyl tin dilaurate, and then all samples were combined with 92.5% of the quantity of MDI necessary to cause the resin to reach its gel point. "Viscosity vs. time after addition" studies were conducted, and the data appear below:

| Dibutyltin dilaurate (parts) | Time after MDI addition (min.) | Viscosity (poise ×10³) |
|---|---|---|
| 1.0 | ½ | 0.85 |
| | ¾ | 1.3 |
| | 1 | 2 |
| | 1¼ | 9 |
| 0.25 | ½ | 0.58 |
| | ¾ | 0.82 |
| | 1 | 1.2 |
| | 1¼ | 1.8 |
| | 1½ | 4 |
| | 1¾ | 10 |
| 0.06 | ½ | 0.32 |
| | ¾ | 0.4 |
| | 1 | 0.5 |
| | 1¼ | --- |
| | 1½ | 0.75 |
| | 1¾ | 0.95 |
| | 2 | 1.1 |
| | 2½ | 1.7 |
| | 3 | 9 |
| 0.025 | ½ | 0.21 |
| | ¾ | --- |
| | 1 | 0.23 |
| | 2 | 0.41 |
| | 3 | 0.66 |
| | 3½ | 0.84 |
| | 4 | 1.0 |
| | 5 | 1.6 |
| | 6 | 9 |
| 0.01 | ½ | 0.2 |
| | 1 | 0.2 |
| | 2 | 0.2 |
| | 3 | 0.23 |
| | 4 | 0.30 |
| | 5 | 0.40 |
| | 6 | 0.48 |
| | 7 | 0.65 |
| | 10 | 1.0 |
| | 12 | 1.7 |
| | 14 | 9 |
| 0 (none) | ½ | 0.2 |
| | 1 | 0.2 |
| | 5 | 0.2 |
| | 10 | 0.2 |
| | 20 | 0.21 |
| | 100 | 0.3 |

This example shows that increasing amounts of hydroxyl group-isocyanate group reaction catalyst will significantly affect the start of the maturation process.

EXAMPLE 6

Portions of the linear polyester resin A of Example 1 were treated as follows: One 100 part portion was combined with 0.4 part of dibutyltin dilaurate catalyst and 99% of the MDI necessary to cause the resin to reach its gel point. A second 100 part portion was combined with 0.4 part of the catalyst and 99% of the 2,4/2,6 (80/20) toluene diisocyanate necessary to cause the resin to reach its gel point. A third 100 part portion was combined with 99% MDI as above but with no catalyst. These samples were observed for start of maturation—the data are tabulated below:

| Time after addition of isocyanate plus catalyst (minutes) | Viscosity (poise) | | |
|---|---|---|---|
| | 99% MDI plus 0.4 parts catalyst | 99% TDI plus 0.4 parts catalyst | 99% MDI no catalyst |
| 1 | 15 | 15 | 15 |
| 2 | 20 | — | — |
| 3 | 50 | — | — |
| 5 | 240 | — | — |
| 7 | 1,000 | — | — |
| 10 | 5,000 | — | — |
| 12 | 10,000 | — | — |
| 45 | — | 30 | — |
| 60 | — | 50 | — |
| 85 | — | 85 | — |
| 175 | — | 320 | — |
| 300 | — | 1,900 | — |
| 400 | — | 10,000 | — |
| 4,000 | — | — | 70 |
| 9,500 | — | — | 520 |
| 19,000 | — | — | 4,700 |
| 24,000 | — | — | 10,000 |

This example shows that polyisocyanates having isocyanate groups of different reactivity (2,4 toluene isocyanate and 2,6 toluene diisocyanate) toward hydroxyl groups will slow the maturation process over that where the polyisocyanate has groups of the same or very close reactivity rate.

EXAMPLE 7

The compounded linear, hydroxyl terminated resin A of Example 1 and the compounded branched resin D of Example 3 were separately molded into small test bars. The surface of each bar was then painted with a coat of heat curable epoxy-alkyd paint (828–2103 E. I. du Pont de Nemours & Co., Inc.) and cured for 30 minutes at 325° F.

An adhesion test was conducted on each bar. This test is performed by scratching ten parallel lines ¹⁄₁₆ of an inch apart on the surface of the painted polyester resin surface. At an angle of about 60° from these lines another set of ten parallel lines ¹⁄₁₆ of an inch apart are scratched with the same knife so as to cross the original lines. Thereafter, a piece of masking tape is pressed onto the scratched surface so that the adhesive portion is against the painted surface. The tape is pressed into full adherence with the painted surface and then is stripped away. A passing paint adhesion test is indicated by the lack of paint removed from the test area of the scratches, whereas a failing adhesion test is indicated by pieces of paint from the scratched area remaining on the adhesive of the masking tape. Such a test is widely recognized in the plastics art and widely used especially in the automotive industry. On each of four (4) test bars of each resin compound the paint test showed a large loss of paint from the magnesium oxide extended resin-based bars whereas virtually no paint loss occurred with the MDI extended resin-based bars.

EXAMPLE 8

Samples of resins were made by standard polymer forming techniques wherein the finished polyester had various hydroxyl functionalities. Each sample was combined with MDI in an amount ranging from 50 to 110% of the stoichiometric quantity necessary to cause each respective resin to reach its gel point. Each resin showed a moldable consistency only within a certain range of MDI concentration, below which the resin was too soft and above which the resin was too stiff or crosslinked to be useful. The MDI concentration ranges along with the corresponding hydroxyl functionality are listed below:

| Resin Hydroxyl Functionality: | Useful MDI Concentration Range (Percent of Stoichiometry) |
|---|---|
| 1 | [1] None |
| 1.5 | [1] None |
| 2 | 85–99 |
| 2.20 | 90–99 |
| 2.5 | 95–99 |
| 3.0 | 97–99 |
| 3.5 | [2] 98.5–99 |
| 4.0 | [2] 98.5–99 |

[1] Samples did not thicken properly.
[2] Range was very narrow.

This example shows that the usable range of hydroxyl functionality in the polyester resin is between 1.8 and 3.

What is claimed is:

1. A fiber-filled thermosetting resin-containing composition for molding under pressure in which the curable resin binder consists essentially of the reaction product, in intimate contact with said filler, of (A) a hydroxy-terminated unsaturated polyester resin having a hydroxyl functionality of between 3.0 and 1.8 and an average molecular weight between 1000 and 5000 and (B) an organic polyisocyanate in an amount between about 85 and 99 percent by weight of the quantity necessary to cause said resin (A) to reach its gel point in contact with (C) a catalyst for the reaction of isocyanate groups and hydroxyl groups in an amount of at least 0.01 weight percent based on the weight of said resin (A), said reaction product containing dispersed therein (D) an aliphatically-unsaturated monomer in an amount to give 1.5 to 2.5 moles of monomer unsaturation per mole of unsaturation in resin (A) and a free radical polymerization catalyst in an amount of at least 0.1 parts per 100 parts of total resin (A) and monomer (D), said binder comprising at least about 10 weight percent of said composition.

2. A molding composition in accordance with claim 1 wherein said resin (A) is essentially linear and has an acid number less than about 2.

3. A molding composition in accordance with claim 2 wherein said fiber filler is present in an amount from about 15 to about 35 weight percent based on the total weight of the molding compound.

4. A molding composition in accordance with claim 3 wherein said polyisocyanate (B) has equally reactive isocyanate groups.

5. A molding composition in accordance with claim 4 wherein said catalyst (C) is a tin salt of a carboxylic acid.

6. A molding composition in accordance with claim 5 wherein said fiber filler is glass.

7. A molding composition in accordance with claim 6 wherein said catalyst (C) is dibutyl tin dilaurate.

8. A molding composition in accordance with claim 6 wherein said resin (A) has a molecular weight of about 2000.

9. A molding composition in accordance with claim 8 wherein said polyisocyanate (B) is 4,4'-diisocyanato diphenyl methane.

10. A molding composition in accordance with claim 1 wherein said composition includes (E) a low shrink additive consisting essentially of a thermoplastic polymer which contains aliphatic unsaturation, which is soluble in monomer (D) but which, when present during the addition reaction of (A) and (D), yields an optically heterogeneous cured compounds, said low shrink additive being present in an amount of 10 to 30 parts by weight per 100 parts of resin (A).

References Cited
UNITED STATES PATENTS

| 2,851,436 | 9/1958 | Forsythe | 260—45.4 |
| 2,879,248 | 3/1959 | Nischk et al. | 260—45.4 |
| 2,888,433 | 5/1959 | Parker | 260—45.4 |
| 3,597,495 | 8/1971 | Sekmakas et al. | 260—75 NK X |
| 3,700,752 | 10/1972 | Hutchinson | 260—77.5 CR X |
| 3,716,523 | 2/1973 | Cook | 260—75 NK X |

HERBERT S. COCKERAM, Primary Examiner

U.S. Cl. X.R.

260—37 N, 75 NB, 75 NC, 75 NK, 77.5 CR, 859; 264—320, 331; 296—31 R

PO-1050
(5/69)

UNITED STATES PATENT OFFICE
CERTIFICATE OF CORRECTION

Patent No. 3,824,201     Dated July 16, 1974

Inventor(s) Francis R. McGranaghan and Henry Shanoski

It is certified that error appears in the above-identified patent and that said Letters Patent are hereby corrected as shown below:

Column 3, line 6, which reads: "of" should read ---to---.

Column 3, line 16, which reads: "accomplishd" should read ---accomplished---.

Column 3, line 20, which reads: "2,625,535" should read ---2,626,535---.

Column 3, line 33, which reads: "inveniton" should read ---invention---.

Column 6, line 49, which reads: "lingakes" should read ---linkages---.

Column 9, line 6, which reads: "(35 by wt. solution of" should read ---(35% by wt. solution of---.

Column 9, line 10, which reads: "0.4" should read ---.04---.

Column 11, Viscosity Table, last column, which reads: " 96% " stoich., poise X10-4  should read ---  96% ---. stoich., poise X10$^4$ Column 12, Example 7, line 41, which reads: "hydroxyl" should read ---hydroxy---.

Signed and sealed this 7th day of January 1975.

SEAL)
ttest:

cCOY M. GIBSON JR.
ttesting Officer

C. MARSHALL DANN
Commissioner of Patents